United States Patent [19]

Jones et al.

[11] 3,995,722

[45] Dec. 7, 1976

[54] FAIL-SAFE DISC BRAKE HAVING A SLACK ADJUSTER MECHANISM

[75] Inventors: Roger D. Jones, Ramsey, N.J.; Charles M. Buchholtz, New York, N.Y.

[73] Assignee: Abex Corporation, New York, N.Y.

[22] Filed: Feb. 18, 1975

[21] Appl. No.: 550,884

[52] U.S. Cl. .............................. 188/71.9; 188/170; 188/196 D
[51] Int. Cl.² ........................................ F16D 59/02
[58] Field of Search ................. 188/166, 170, 71.8, 188/71.9, 72.3, 216, 196 D, 196 P; 192/89 A, 91 R; 92/63, 130

[56] References Cited

UNITED STATES PATENTS

| 2,870,870 | 1/1959 | Voigt | 188/196 P |
|---|---|---|---|
| 2,966,964 | 1/1961 | Brueder | 188/71.9 |
| 3,292,740 | 12/1966 | Swift | 188/71.9 |
| 3,297,115 | 1/1967 | Walöen et al. | 188/170 |
| 3,547,229 | 12/1970 | Pollinger | 188/71.9 |
| 3,633,715 | 1/1972 | Burnett | 188/170 |
| 3,661,230 | 5/1972 | Burnett | 188/170 |
| 3,724,620 | 4/1973 | Benson | 192/89 A |
| 3,726,367 | 4/1973 | Evans | 188/170 |
| 3,842,949 | 10/1974 | Newstead | 188/170 |
| 3,944,027 | 3/1976 | Yamamoto | 188/170 |

FOREIGN PATENTS OR APPLICATIONS

| 1,180,137 | 2/1970 | United Kingdom | 188/71.9 |
|---|---|---|---|
| 1,219,380 | 1/1971 | United Kingdom | 188/71.9 |

Primary Examiner—Trygve M. Blix
Assistant Examiner—Edward R. Kazenske
Attorney, Agent, or Firm—Kinzer, Plyer, Dorn & McEachran

[57] ABSTRACT

A fail-safe actuator for a disc brake system. A housing contains a reciprocating piston having a retracted position, a spring which urges the piston forward away from its retracted position, and means for retracting the piston against the urging of the spring. An expansible linkage, which connects the piston to the friction element of the brake is expanded in response to retraction of the piston, thereby maintaining a uniform spring expansion per brake application regardless of friction element wear.

18 Claims, 13 Drawing Figures

FAIL-SAFE DISC BRAKE HAVING A SLACK ADJUSTER MECHANISM

BACKGROUND OF THE INVENTION

This invention relates generally to friction brakes and more particularly concerns a spring-applied fail-safe brake actuator.

Friction brakes are used to slow or stop a machine by converting its energy of motion into heat. This is generally accomplished with a brake actuator which forces a friction element against a rotating braking surface to restrain its rotation. The present invention concerns an improved friction brake actuator for many applications and particularly for the heavy duty disc brake system of railroad vehicles and automotive trucks. The present invention would similarly be useful for actuating the brakes of aircraft and any mechanical devices requiring disc brakes such as large power hoists and the like.

A disc brake system generally consists of a brake disc gripped pincer-wise between a pair of brake pads fitted with friction linings. An operator-controlled brake actuator forces the friction linings of the brake pads into engagement with the brake disc to apply the brakes; and pulls the friction linings away to release the brakes.

The dependability of the disc brake system is a critical factor in the safe operation of a vehicle or machine on which the brakes are installed. In railroad vehicles and automotive trucks, the very lives of the operator and/or passengers may depend on the safe dependable operation of the brake system in potential accident situations. Furthermore, in urban commuter train networks brake dependability is one of the factors determinative of the required spacing between trains in the congested traffic on urban tracks. Improvements in brake dependability thereby allow such commuter trains to safely run closer together, faster or both, all of which results in more frequent commuter service for the urban population.

Accordingly, one object of the present invention is to improve the safety and dependability of friction brake systems, which object is accomplished by providing a fail-safe brake actuator which is effective to apply the brakes in response to brake system failure as hereinafter disclosed in detail.

Besides safety, the structure of friction brake actuators must satisfy additional conflicting criteria. Whereas in spring applied brakes, it is desirable to have the actuator imcorporate a spring powerful enough for effective braking under the most severe conditions, it is also desirable to minimize the overall size of the spring and actuator. The problem is that as the brake pads wear, the spring expansion required per brake application increases to compensate for the lost pad thickness. In heavy duty actuators such as those used on commuter trains or trucks, a long spring with a lower spring rate would be required to provide a relatively constant braking force over the span of brake pad movement which varies according to pad wear. Such a spring, which could provide sufficient spring force would probably weigh seventy-five to one hundred pounds. Disc or Belleville springs are desirable for such actuators because of their extremely high load capacity but a Belleville spring system would have to be at least about two feet long to accomodate for pad wear. It is therefore a further object of the present invention to eliminate the effects of pad wear on the actuator spring so that a powerful spring expandable through a uniform short distance may be used to provide effective braking regardless of pad wear.

The structural criteria that actuators of communter trains be of minimal size is largely due to the popularity of parallel motor drive. The power transmission efficiency and space savings of such an arrangement are well known. On railroad cars with right angle drive, wherein the power plant may be substantially removed from the drive axle and connected thereto by a drive shaft, it may be feasible to use a rather large cumbersome brake caliper. But in parallel drive units, wherein the power plant is positioned directly adjacent the drive axle, space is at a premium. It is therefore another object of the present invention to provide as small and compact a brake actuator as possible primarily by minimizing the length of spring expansion required to apply the brakes.

A similarly related object is to provide an actuator with a powerful but light spring for the consequent weight savings which is always a bonus in railroad and truck vehicle construction.

A further object is to eliminate the need for a separate and independent parking brake apparatus for vehicular brake systems. Specifically, it is an object to provide a spring-applied brake actuator which automatically performs as a parking brake.

SUMMARY OF THE INVENTION

In accordance with the present invention, an acutator is provided for a brake system having a friction element engageable against a rotatable braking surface. The actuator comprises a housing with a piston reciprocal therein to and from a retracted position. A fail-safe condition is achieved by providing a spring which constantly urges the piston forward away from its retracted position to apply the brakes. Forward translation of the piston is in turn imparted to a friction element by means of an expansible linkage. In order to release the brakes, means are provided for retracting the piston against the urging of the spring. To significantly reduce the required size and weight of the brake actuator without sacrificing braking force, means are provided for expanding the linkage in response to piston retraction, thereby maintaining a generally uniform spring expansion per brake application regardless of friction element wear.

DESCRIPTION OF THE PREFERRED EMBODIMENTS

Figure 1:
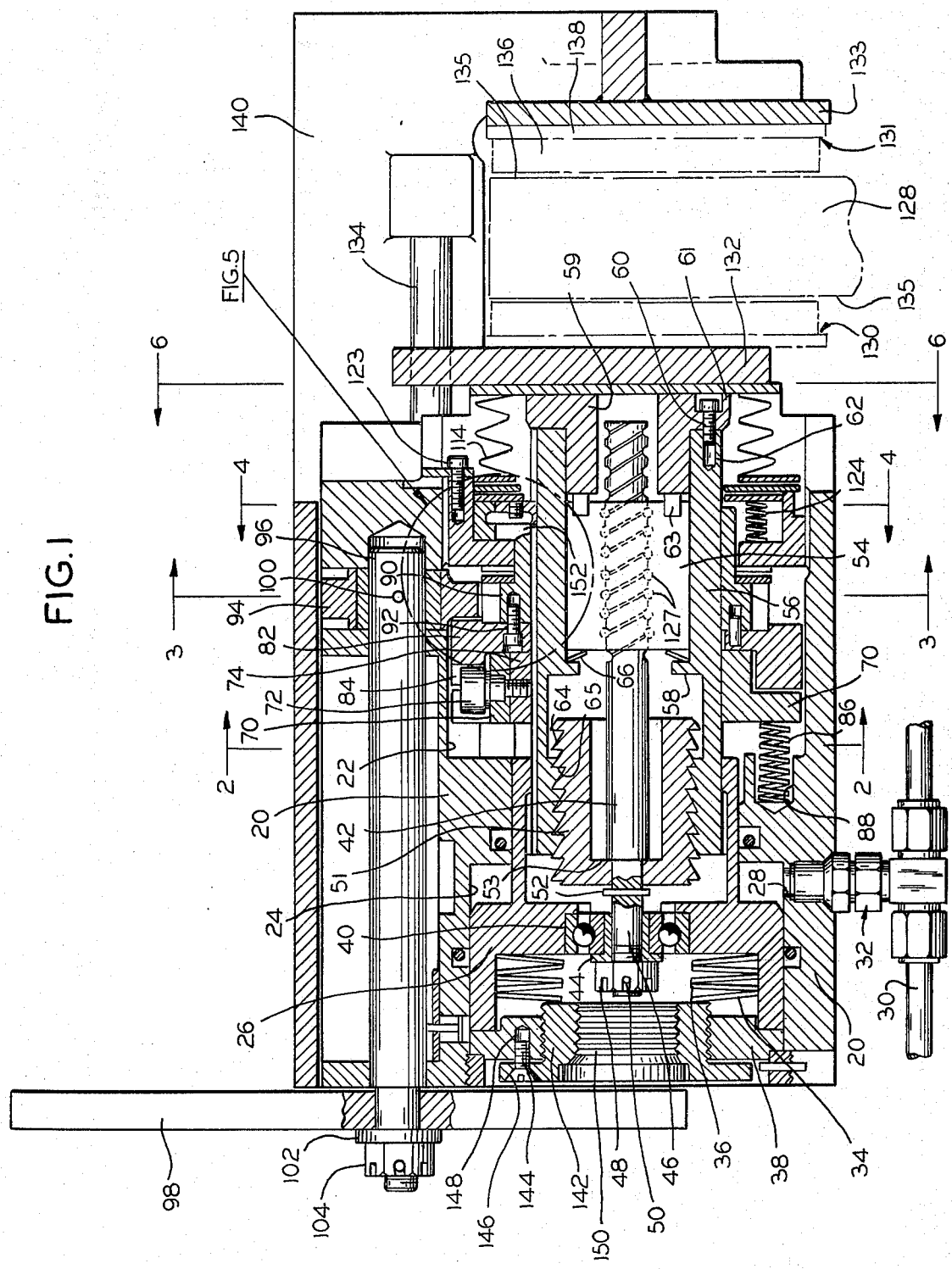
FIG. 1 is a sectional side view of a disc brake caliper constructed in accordance with the present invention.

An actuator constructed in accordance with a preferred embodiment of the present invention is illustrated in FIG. 1. A housing 20 is provided with a large bore 22 of varying diameter extending longitudinally therethrough and having a cylindrical portion 24 with a piston 26 reciprocal therein. A hydraulic fluid port 28 opens into cylinder 24 establishing communication with hydraulic pressure line 30 through an appropriate coupling 32. Hydraulic pressure supplied to cylinder 24 is effective to retract the piston leftward (FIG. 1) against the urging of Belleville spring 34.

The Belleville or disc spring comprises a series of dished or otherwise specially shaped discs 36 which act similarly to spring washers in combined bending and direct stress. Retracting movement of the piston is limited by engagement with housing cap 38, such engagement being hereafter defined as the retracted position of the piston.

Our invention may be best disclosed by segregating its functional assemblies and describing each separately as follows.

APPLICATOR SCREW ASSEMBLY

The applicator screw assembly is an expansible linkage associated with the piston for imparting the forward translation of piston 26 to a friction element, as described below.

Piston 26 carries a ball bearing 40 and with it a ball screw 42 (FIG. 1). A sleeve bearing 44 is interposed between the ball bearing and a narrow end portion 46 of the ball screw. The free end of the narrowed portion of the ball screw is threaded to receive lock nut 48 which is locked onto the ball screw by roll pin 50. The base of a generally cup-shaped actuator screw 51 is carried on the forward end of the narrowed end 46 of the ball screw. The base has a radial slot opening toward ball bearing 40 for receiving roll pin 52, which fixes the actuator screw for rotation in unison with the ball screw. Axial displacement of the actuator screw relative to the ball screw is limited on one side by the roll pin 52 and on the forward side by shoulder 53 defining the forward end of the narrowed end portion 46 of the ball screw.

The ball screw is threaded through a ball bearing nut or ball nut 54 for essentially frictionless rotation relative thereto. Ball nut 54 is in turn slidingly fit within one end of an actuator nut 56 and confined therein between an inner annular shoulder 58 and an actuator nut cap 59. In the preferred embodiment, the nut cap is a generally cylindrical member recieved in circumferential engagement within the actuator nut with a widened annular flange adapted to engage the annular end surface of the actuator nut. Nut cap 59 is rigidly secured to the actuator nut by a screw 60 inserted through one of five circumferentially spaced counterbored holes 61 in the nut cap and screwed into one of six tapped holes 62 in the actuator nut. The nut cap also has four projecting fingers 63 which prevent rotation of the ball nut. The opposite end of the actuator nut is threaded to receive the actuator screw.

The threads of the actuator screw and nut are generally double buttress type threads having wide inclined faces presenting friction surfaces 64 and generally upright opposite faces 65. A double thread is a multiple form having two separate or single threads starting diametrically opposite or at points 180° apart. Such a thread increases the lead of a screw without weakening it by cutting a coarse single thread. A buttress thread is generally used for the transmission of power in one direction only. The configuration of these threads is such that engagement of the wide inclined friction surfaces locks the actuator screw and nut together in fixed angular relationship whereas disengagement allows them to rotate generally freely with respect to one another.

A preload spring washer 66 is provided between ball nut 54 and actuator nut shoulder 58 to urge the sloping friction surfaces of the actuator screw and nut together. Unless this preload force is overcome, the actuator screw and nut are locked and travel together.

MANUAL RELEASE ASSEMBLY

Figure 2:
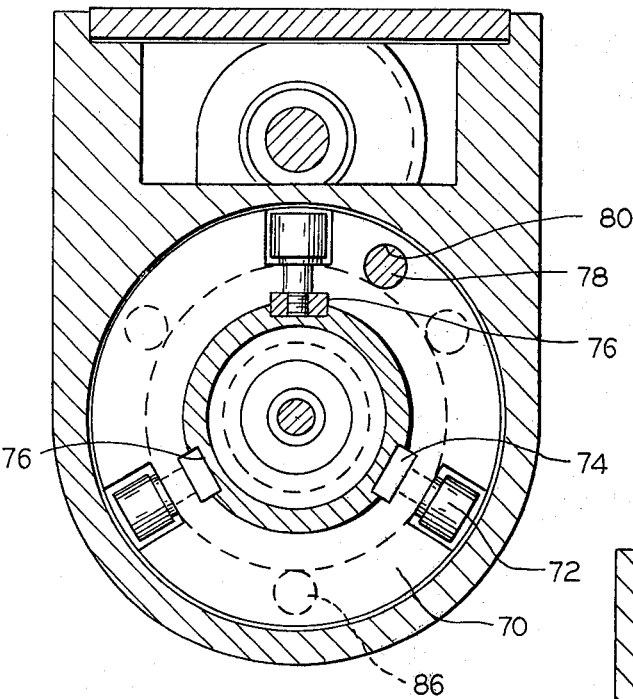
FIG. 2 is a sectional view taken along line 2—2 of FIG. 1.

The manual release assembly provides a mechanism for manually retracting piston 26 against the urging of Belleville spring 34. A cam follower spider 70, shown best in FIG. 2, encompasses the actuator nut within the housing and has three cam followers 72 which are equally spaced and radially arranged with respect to spider 70. Three nuts 74 hold the cam followers on the spider and also serve as keys preventing the actuator nut from rotating. Nuts 74 are slidingly journaled within three equally spaced longitudinal slots 76 in the outer circumference of the actuator nut. Spider 70 is itself prevented from rotating within the housing by a dowel pin 78 (FIG. 2) which is fixed within a bore 80 in the spider and inserted into an aligned hole in the housing, thereby allowing the spider to slide axially within the housing.

A manual release cam 82, shown in FIG. 1, engages cam followers 72 and is effective to move the spider axially within the housing. The cam has three axial cam surfaces 84 for contacting each of the cam followers. This contact is insured through the pressure of three spider springs 86 which extend from equally spaced openings 88 in the housing to urge the spider into engagement with the release cam. The release cam is rigidly fastened to a release gear 90 by means of three equally spaced socket head cap screws 92. The release cam can be rotated by a release pinion assembly in cooperation with release gear 90.

Figure 3:
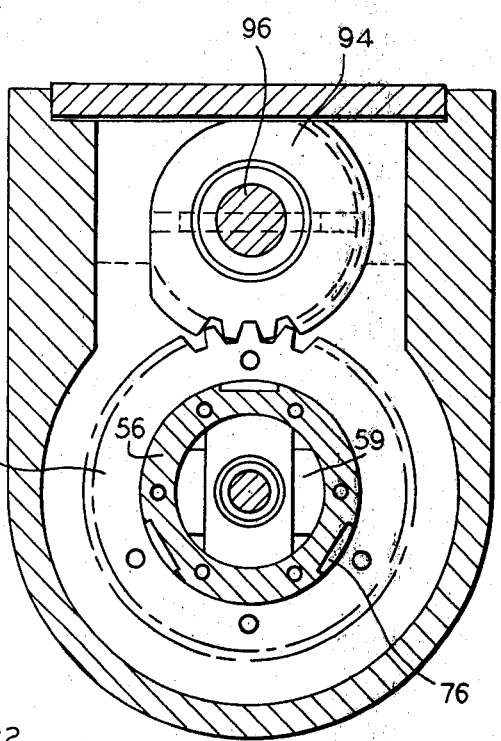
FIG. 3 is a sectional view taken along line 3—3 of FIG. 1.

The release pinion assembly, as illustrated in FIG. 1 and 3, comprises a release pinion 94, release shaft 96 and release arm 98. The pinion and release shaft are fastened for mutual rotation within the housing by roll pin 100. Gear teeth of the pinion and release gear are intermeshed to transmit rotation of the shaft to the release gear. Release arm 98 is rigidly secured to one end of the release shaft by a washer 102 and lock nut 104 to provide leverage means for rotating the shaft. Thus, rotation of release arm 98 is transmitted to release gear 90 which, in turn, rotates the release cam 82 thereby forcing cam follower spider 70 to the left (FIG. 1) until hydraulic piston 26 is engaged. If the piston is in any position other than its retracted position in engagement with housing cap 38, it would be moved to its retracted position.

Release cam 82 has detent positions at both ends of its rotation to hold the piston in its retracted position against the urging of Belleville spring 34.

To facilitate operation of the manual release assembly, a needle thrust bearing 106 (FIG. 5) is interposed between bearing races 108 and 110, all of which are located against an annular face 112 of the release gear to reduce the force necessary to compress Belleville spring 34.

SLACK ADJUSTMENT ASSEMBLY

Figure 5:
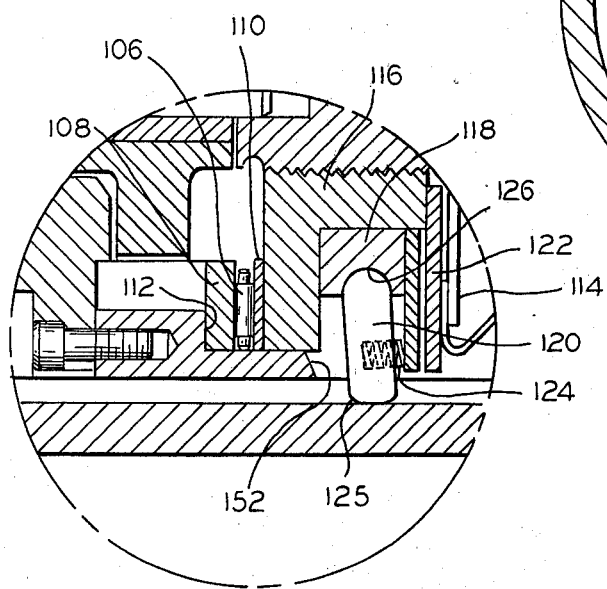
FIG. 5 is an enlarged sectional view of a circular segment of FIG. 1 showing a portion of the slack adjustment assembly described below.
Figure 4:
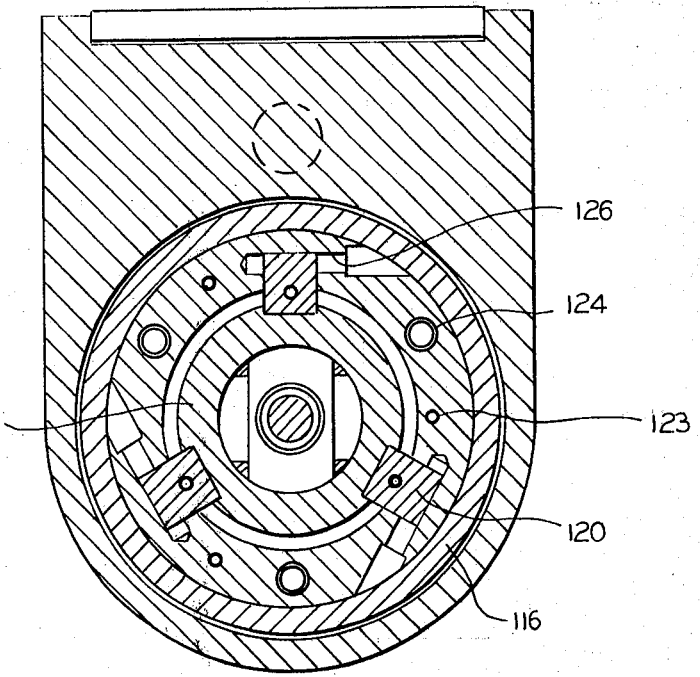
FIG. 4 is a sectional view taken along line 4—4 of FIG. 1.
Figure 6:
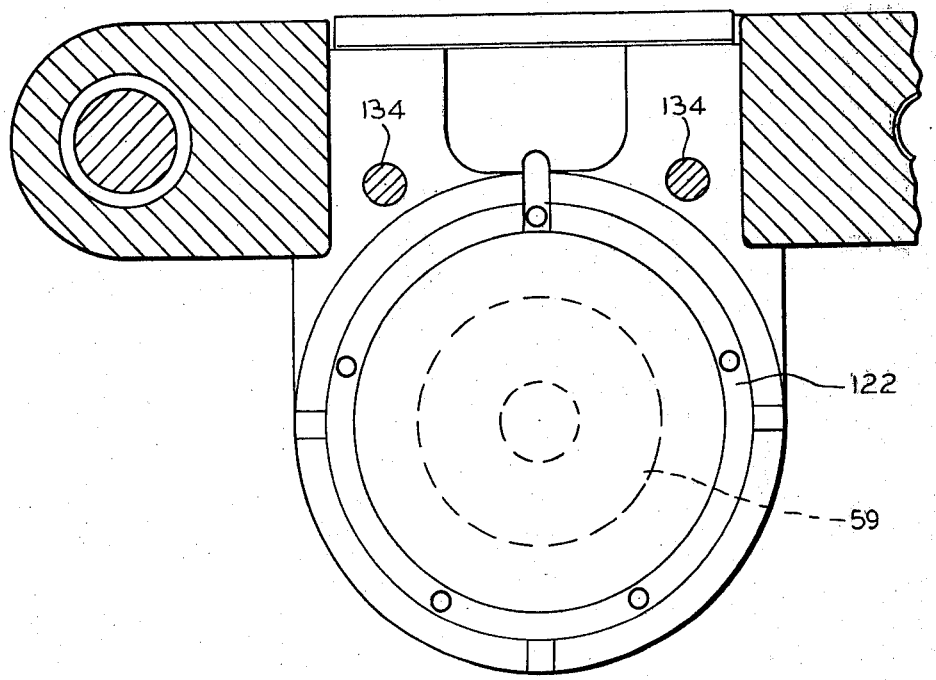
FIG. 6 is a sectional front view taken along line 6—6 of FIG. 1.

The slack adjustment assembly, shown in FIG. 1, 4 and 5, is located between needle thrust bearing 106 and a bellows seal 114 which is provided to accomodate expansion of the applicator screw assembly. The slack adjustment assembly comprises bearing adjustment nut 116, slack adjustment sleeve 118 and three spring loaded one-way clutches 120 of the friction type. Bearing adjustment nut 116 is threaded into opening 22 of the housing and has a bellows seal 114 and a sealing washer 122 fastened to it by three circumferentially spaced screws 123 (FIG. 1) or other suitable means.

Slack adjustment sleeve 118 is urged to the right (FIG. 1) by slack springs 124. Again, these springs may be equally circumferentially spaced about the slack adjustment sleeve to urge it against sealing washer 122. In the preferred embodiment shown, there is approximately 0.060 inches axial movement available to the slack adjustment sleeve.

in the embodiment shown in FIGS. 4 and 5, the one-way friction clutches are rectangular members having rounded upper surfaces and lower clutch surfaces 125 adapted to engage the actuator nut in slots 76. The one-way clutches pivot about the axes of generally cylindrical bores 126 (FIG. 4) in slack adjustment sleeve 118 and are so inclined as to permit the advancing movement of the actuator nut 56 (to the right, FIGS. 1 and 5) If the actuator screw assembly is retracted (to the left, FIGS. 1 and 5) however, clutch springs 124 are effective to urge the one way clutches to tenaciously grip the actuator nut. Slack adjustment sleeve 118 is thus carried approximately 0.060 inches until stopped by bearing adjustment nut 116. The bearing adjustment nut thus constitutes a clutch stop member which cooperates with the clutch to permit retraction of the actuator nut through a limited brake release distance, the 0.060 inches above, for example, but it prohibits further retraction thereof. Should hydraulic piston 26 not be seated in its retracted position against housing cap 38, then further retraction of the piston would flex preload spring 66 and pull the friction surfaces 64 of the actuator screw and nut apart. The preload Belleville spring 66 forces the ball nut to the right (FIG. 1) which thereby induces rotation of a ball screw 42 until the friction surfaces of the actuator screw and nut are again firmly in contact. Thus, the slack adjustment assembly is effective to expand the applicator screw assembly in response to piston retraction.

Rotation of ball screw 42 within actuator screw 51 is aided by ball nut anti-friction bearings 127 and ball bearing 40 as well as the high lead angle of the ball screw. It is an axiom of this design that the lead of both the ball screw and actuator screw be indentical since they rotate in unison. The actuator screw however, is self locking whereas the ball screw is never self locking.

BRAKE SURFACE ASSEMBLY

The brake surface assembly consists of the brake disc 128 (FIG. 1) two brakes shoes 130 and 131 fastened to back-up plates 132 and 133 respectively. Plate 132 is constrained by guide pins 134. Each of the radial surfaces of brake disc 128 presents a rotatable braking surface 135. Each of the brake shoes 130 and 131 consist of a friction element or brake pad 136 and a plate 138. When the brakes are in the APPLY MODE, hydraulic pressure in cylinder 24 is reduced allowing Belleville spring 34 to advance the applicator screw assembly to the right (FIG. 1) forcing brake shoes 130 and 131 against rotatable braking surfaces 135. The fixed brake shoe 131 is held by a "C" frame portion 140 of housing 20 and opposes the thrust of the moving brake shoe 130. Brake disc 128 is thus gripped between the two brake pads 136. Brake shoe 130 is held in axial alignment with disc 128 by the plate guide pins 134 along which back-up plate 132 is free to slide.

ADJUSTMENT FEATURES

The braking force exerted by Belleville spring 34, with piston 26 in its retracted position, is dependent on the degree of spring compression incident to that position of the piston. The degree of such spring compression may be adjusted by screwing adjusting cap 142 (FIG. 1) into or out of housing cap 38. Screw 144 is inserted through one of four equally spaced counter sunk holes 146 in adjusting cap 142 and threaded into four of five tapped holes 148 in housing cap 38. It is preferred that a venier adjustment provide for incremental adjustment of approximately 10 pounds of spring force.

A similar vernier adjustment is provided for the ball nut pre-load Belleville spring 66. Actuator nut 56 has six tapped holes 62 while nut cap 59 has five holes 61. It is preferred that this combination provides an incremental adjustment of about three thousandths of an inch.

TYPICAL BRAKE OPERATION

When a "release" command is received by a valve of an external hydraulic power source, oil under pressure flows into cylinder 24 through the hydraulic tubing 30 and inlet port 28. The hydraulic pressure moves the piston assembly to the left against the urging of Belleville spring 34. Retraction of the actuator screw assembly pulls brake shoe 130 away from the brake disc 128 but the retracting movement is limited to approximately 0.060 inches by the slack adjustment assembly. If further retraction of the hydraulic piston is required to reach its retracted position, the actuator screw assembly will be elongated by the length of such additional retraction.

In response to an operator-controlled APPLY command to the external hydraulic power unit, hydraulic pressure in cylinder 24 is lowered permitting the compressed Belleville spring 34 to expand thereby advancing the actuator screw assembly to the right which forces brake shoes 130 and 131 against brake disc 128. The braking force will be the force of Belleville spring 34 less the force of the oil pressure in cylinder 24. Advancing motion of the actuator screw assembly is unimpeded by the slack adjustment assembly since one-way clutches 120 are free to rotate in the direction of motion.

Fail-Safe operation of the present invention is accomplished by providing a spring-applied brake actuator. Whenever the brakes are in the RELEASE MODE, any electrical power failure, or oil pressure loss, will permit the Belleville spring 34 to drive the actuator screw assembly to the right (FIG. 1) applying the brake.

As shown in FIG. 1, a coupling 32 is employed to transmit fluid under pressure in line 30 to port 28 which charges cylinder 24 normally to retract the piston. A control valve (not shown) is used to control the pressure in line 30 and, in the event of electrical failure, this valve opens, draining cylinder 24, whereupon spring 34 expands to the fail-safe condition.

Inherent in the structure of this device is the capability to perform as an automatic parking brake in most applications, thus eliminating the cumbersome devices normally added to vehicles when spring applied brakes are not installed.

The operation of the present invention in its manual release mode is as follows. Manual release of the brakes may be required where the brakes were applied in response to an electrical or hydraulic failure or simply for replacement or inspection of pads 136. This is achieved through the manual release assembly. Rotating the manual release arm 98 rotates the release cam 82 thereby retracting cam follower 70. This movement forces the actuator screw assembly to the left until the manual release assembly reaches a detent position of the release cam 82. The brake is thus held in the manual release mode.

Rotation of the manual release arm 98 uncovers cylinder cap plug 150, FIG. 1, which is screwed into adjusting cap 142. Removing plug 150 permits a socket wrench to be inserted into the housing to rotate bearing lock nut 48 which, in turn, rotates ball screw 42 and actuator screw 51. Thus the actuator nut may be retracted over the actuator screw, allowing the brake shoes 130 and 131 to be removed safely. Manual retraction of the actuator nut is not impeded by the slack adjustment assembly because of a clutch release mechanism which, in this embodiment, is associated with release gear 90. Gear 90 has cam surfaces 152 positioned before each of the three one-way clutches 120. As gear 90 rotates, cam surfaces 152 move against the one-way clutches and urge them to the right (FIGS. 1 and 5), preventing them from gripping the retracting actuator nut.

If the actuator screw assembly has been retracted for maintenance, the slack adjustment has been lost. Installation of worn pads could leave up to an inch of slack in the system. To pick up this slack after inspection, the brakes are applied either through the operator-controlled APPLY command or by reversing the manual release operation. Each application will advance the actuator screw assembly a limited distance defined by the length of axial travel of piston 26 permitted within the dimensions of cylinder 24. The brakes are applied repeatedly until brake shoes 130 are set against brake disc 128. Further actuations will not advance the actuator screw assembly beyond the compensation automatically made for wear.

Note that in the APPLY MODE the actuator screw assembly acts as a rigid link, with each of its parts fixed in position relative to the others. Piston 26 directly engages one end of actuator screw 51 creating frictional engagement to further resist rotation of the actuator screw. Rotation relative to the actuator nut is prevented by engagement of the friction surfaces of the buttress threads, which engagement is maintained by the preload Belleville spring 66. Since the actuator nut is, in turn, rigidly fastened to the actuator nut cap, advancing movement of the piston is imparted to the friction element of the brake.

As hydraulic pressure retracts piston 26 against the urging of Belleville spring 34, the piston is disengaged from the end surface of the actuator screw and the friction surfaces between the actuator screw and nut may be similarly disengaged within the small axial play permitted by the threads. When retraction of the actuator nut is limited by the one-way clutch, the various parts of the actuator screw assembly begin to rotate in order to allow the assembly to expand so that the piston can attain its retracted position. Retraction of the piston is directly imparted to the ball screw which tends to carry the ball nut with it compressing the preload spring. The preload spring is then effective to advance the ball nut against the retracted ball screw causing of the latter to rotate within the frictionless bearings of the ball nut. At the same time, the actuator screw, which is fixed for rotation with the ball screw, is similarly rotated within the stationary actuator nut thereby extending the applicator screw assembly.

Thus, the applicator screw assembly constitutes a one-way screw mechanism in that the actuator screw and nut lock up when the screw is advanced into the nut but can be free to rotate when the screw is retracted out of the nut. Together, the slack adjustment assembly and applicator screw assembly cooperate to provide an irreversible rachet arrangement for taking up the slack in a disc brake actuator due to pad wear.

It will be understood that the slack adjustment assembly is generally operated in response to wear of the friction element or brake pads 136. If the brake pads were not subject to wear, the actuator screw assembly would simply advance and retract within the axial play of the slack adjustment sleeve 18. As the pad wears however, the actuator screw assembly must be advanced further to engage the thinner brake pads against the disc. But since the brake release distance is fixed by the slack adjustment assembly, retraction of the piston in excess of that distance is taken up by expansion of the applicator screw assembly. Accordingly, applicator screw assembly is advanced a constant distance per brake application, resulting in a uniform spring expansion per brake application regardless of pad wear.

Figure 7:
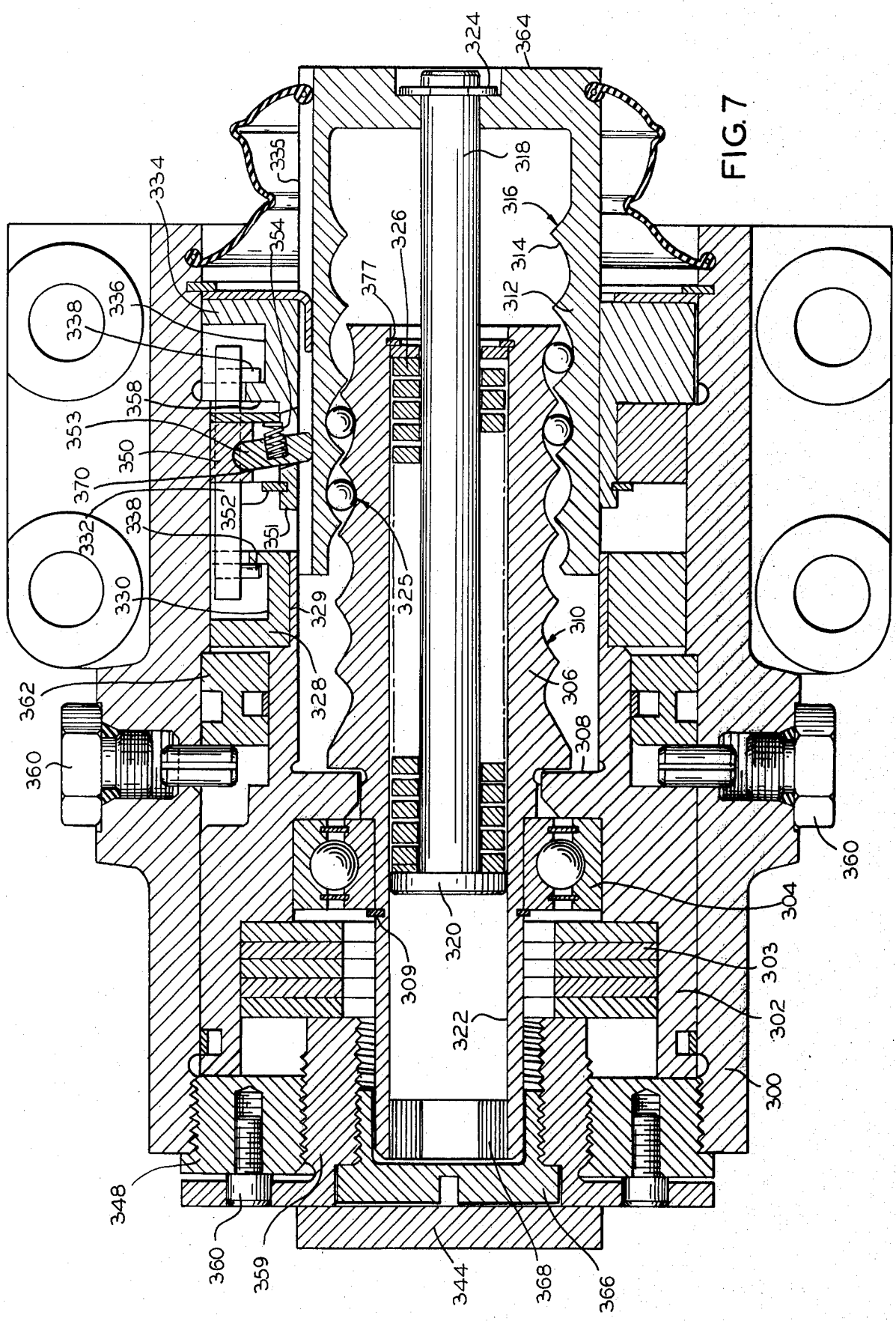
FIG. 7 is a sectional side view of another embodiment of the present invention.

Another embodiment of the present invention is illustrated in FIGS. 7 through 12. The same assemblies discussed above are equally applicable to this embodiment although the structure of various parts are different. Referring to FIG. 7, a housing 300 has a piston 302 reciprocable therein which is urged to the right by Belleville spring 303. The piston carries a ball bearing 304 and with it actuator screw 306. Although actuator screw 306 is thus free to rotate relative to piston 302, it is constrained to travel axially therewith. An inner annular shoulder 308 of the piston engages a threaded portion of the actuator screw in response to advancing movement (to the right FIG. 7) of the piston. Retracting movement (to the left, FIG. 7) of the piston is transmitted to the actuator screw through ball bearing 304 which is journaled in the actuator screw by means of snap-ring 309. The right end (FIG. 7) of the actuator screw is threaded with double pitch buttress threads 310 similar to those described in connection with the prior embodiment except with the addition of ball bearings 325 to provide frictionless release. Actuator nut 312 has identical internal threads for receiving the actuator screw. Note that these threads are also provided with relatively wide inclined faces 314 presenting friction surfaces and opposite ball bearing faces 316.

A shaft 318 has a head 320 at one end slidingly set within a cylindrical opening 322 extending longitudinally through ball screw 306. The other end of the shaft extends axially through actuator nut 312 to which it is coupled for advancing movement by snap-ring 324. A preload helical compression spring 326 encompasses the shaft within ball screw 306 and is retained therein by snap-ring 377. The preload spring bears against shaft head 320 tending to retract the shaft within the ball screw. Since this effectively urges actuator screw 306 into actuator nut 312, the friction surfaces of the actuator screw and nut are urged into engagement.

The actuator screw assembly of this embodiment thus consists of piston 302, actuator screw 306, actuator nut 312 and shaft 318 as well as ball bearings 304 and 325, preload spring 327 and the various snap-ring fasteners.

Figure 11:
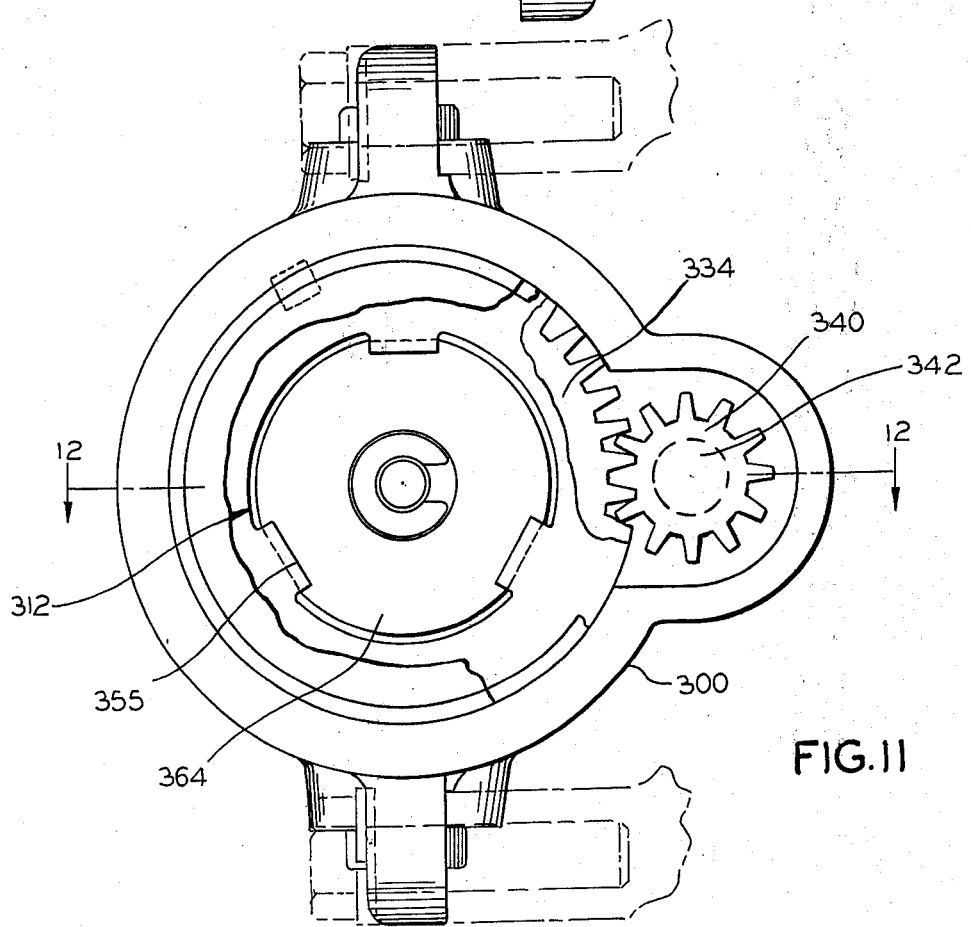
FIG. 11 is a front view of the embodiment of FIG. 7, partially fragmented to show a portion of the manual release assembly described below.
Figure 12:
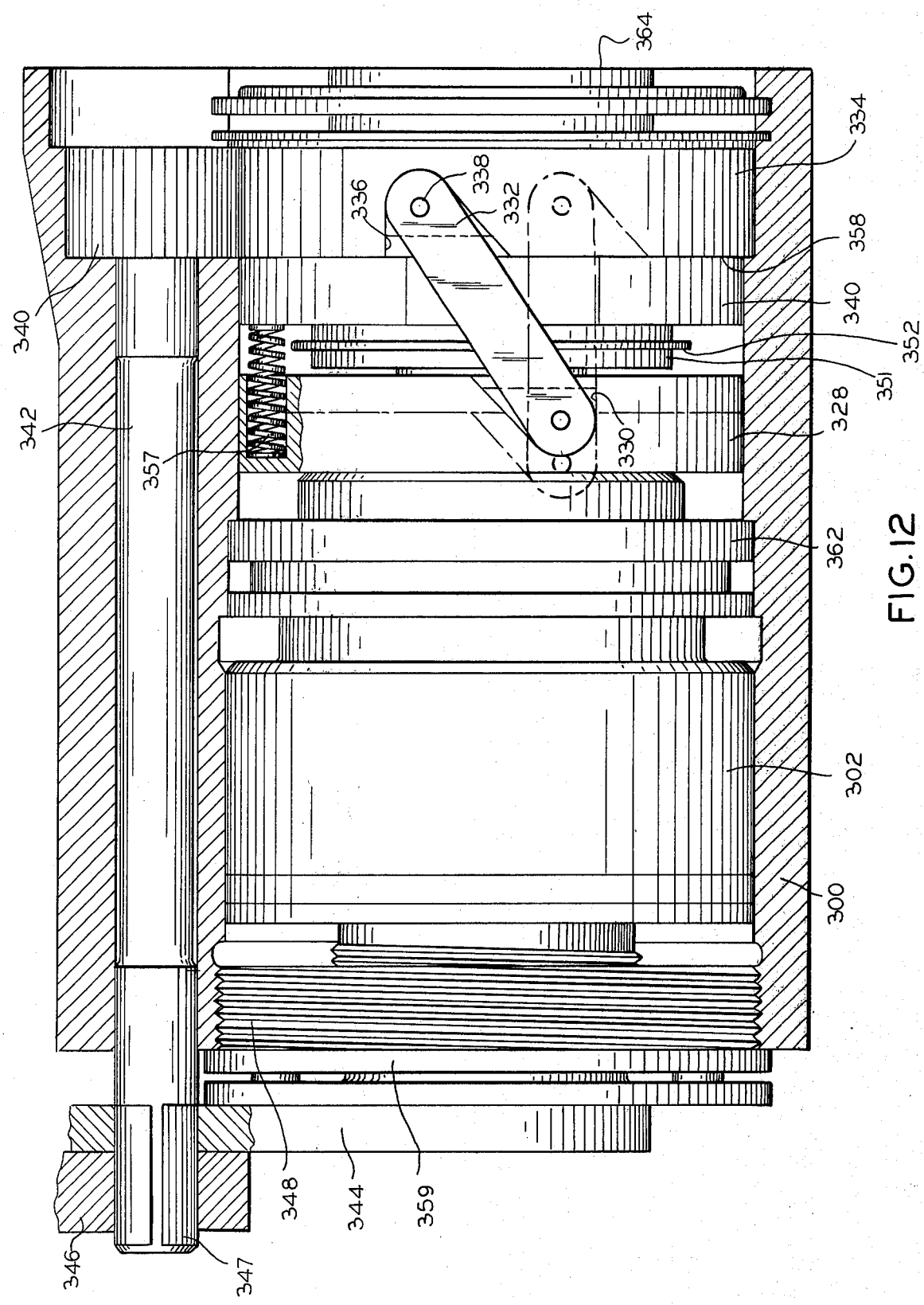
FIG. 12 is a partially sectional view taken along line 12—12 of FIG. 11.

The manual release assembly of this embodiment is shown best in FIGS. 7, 11 and 12. An annular spider member 328 is slidingly engaged about a thin annular end portion 329 of piston 302. Spider 328 has three cut out portions 330 for pivotally receiving one end of three pivotal links 332. The other ends of the pivotal links are similarly connected to annular gear 334 within similar cut out portions 336. Connecting links 332 are pivotally fastened to the spider and gear by means of pins 338. Release gear 334 can be rotated by a release pinion assembly comprising release pinion 340 (FIG. 12), release shaft 342 and cover plate 344. The cover plate is associated with a release arm 346 (FIG. 12), both of which are set socket-like over a squared end portion 347 of release shaft 342. Thus, rotating release arm 356 rotates pinion 340 which in turn rotates gear 334 which forces spider 326 to the left (FIGS. 7 and 12) by changing the angle of the connecting link between them. As shown in FIG. 12, connecting link 332 may be reciprocated between its position indicated in solid lines and a position sketched in dotted lines in FIG. 12 wherein the link is positioned normal to both the spider and release gear. Such relative angular displacement of the ends of connecting links 332 displaces the spider leftward into engagement with piston 302 which further displaces the piston to its retracted position indicated in FIG. 7. In this position, further retraction of the piston is prevented by engagement with the housing end cap 348. Note that the retracted position of the piston corresponds to the perpendicular (dotted line) position of connecting link 332 which is thus in a neutral position. Force exerted by Belleville spring 303 to advance the piston is transmitted axially through connecting link 332 with no lateral component to induce either end to rotate relative to the other.

The slack adjustment assembly is interposed between the spider 328 and release gear 334. Slack adjustment sleeve 350 (FIGS. 7 and 10) is engaged around an annular extension 351 of gear 334 and retained thereon by snap-ring 352. Three one-way friction clutches 353 are equally circumferentially spaced about actuator nut 312 and each is pivotally engaged within sleeve 350 and biased by clutch springs 354 into engagement with actuator nut 312 in longitudinal slots 355. As shown best in FIG. 10, three bores 356 are formed in the slack adjustment sleeve to provide generally semi-circular inner sleeve sections in which the one-way clutches are free to pivot.

The slack adjustment sleeve 350 is urged to the right by circumferentially spaced slack springs 357 (FIG. 12) until it bears against an annular face 358 of release gear 334. Thus there is some limited axial movement available to the slack adjustment sleeve. The one-way clutches again permit advancing movement of the actuator nut but tenaciously grip it to prevent retraction beyond the limted axial play of the slack adjustment sleeve. Further retraction of piston 302 retracts the actuator screw thereby disengaging friction surfaces 314 and flexing preload spring 326. Rotation of the actuator screw within ball bearing 304 is then induced by the ball bearings 325 until friction surfaces 314 are once again in engagement and the actuator screw assembly extended.

Adjustment features are provided similar to those discussed in the prior embodiment. The braking force of the Belleville spring 303 may be adjusted by screwing adjusting cap 359 into or out of housing end cap 348. As shown in FIG. 7, a hex socket bolt 360 fastens adjusting cap 359 to housing cap 348 and thereby provide the vernier adjustment for spring compression.

The typical brake operation of the embodiment is similar to that described above. An external operator-controlled release command is effective to deliver high pressure oil into housing 300 through appropriate couplings 360. An annular hydraulic fluid seal 362 is provided to retain the hydraulic fluid in the cylindrical portion of the housing between itself and piston 302. Hydraulic pressure retracts piston 302 against the Belleville spring 303 thereby retracting actuator nut 312 through the limited axial play permitted by adjustment sleeve 350.

Figure 8:
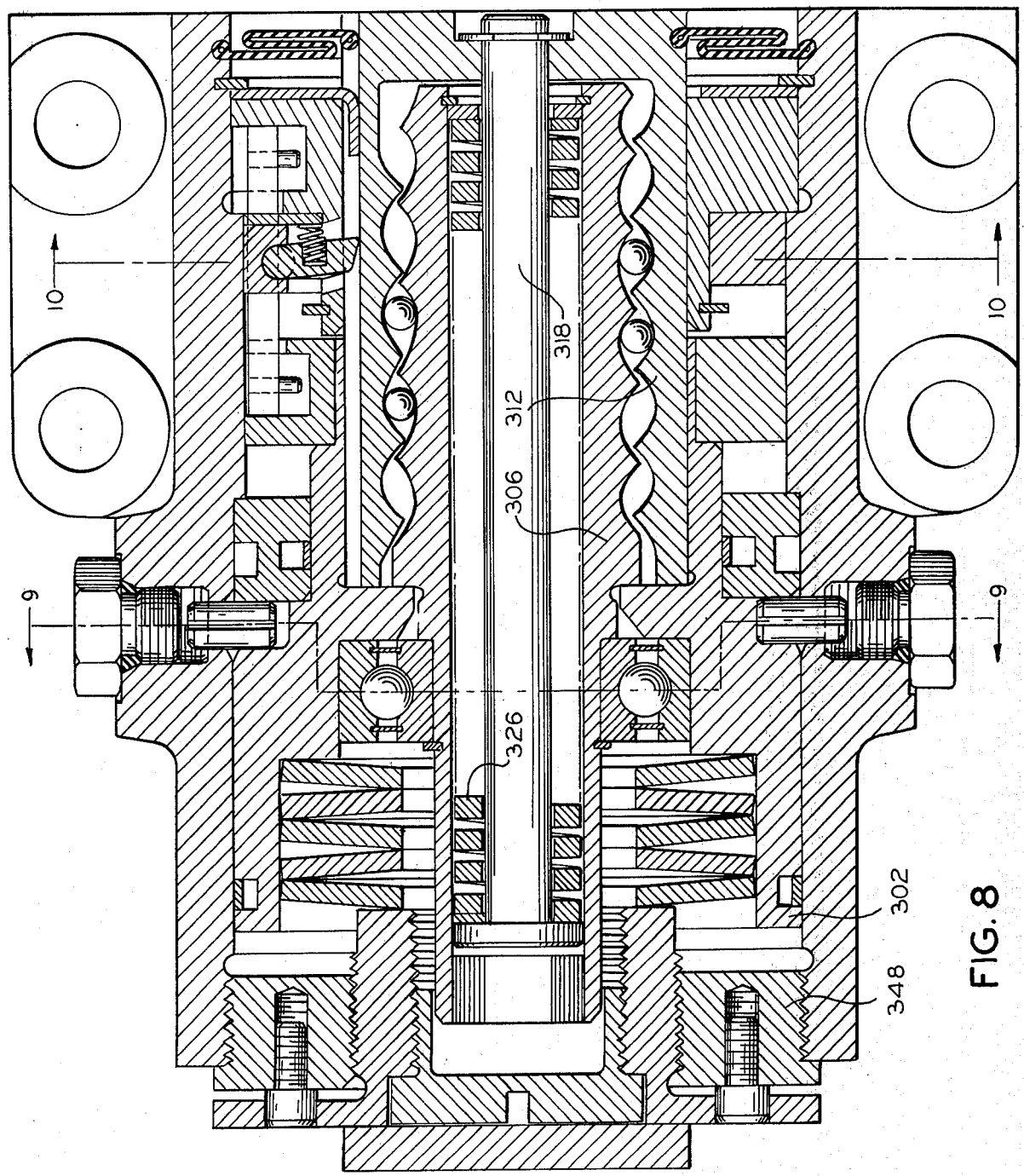
FIG. 8 is similar to FIG. 7, showing the applicator screw assembly completely collapsed.
Figure 9:
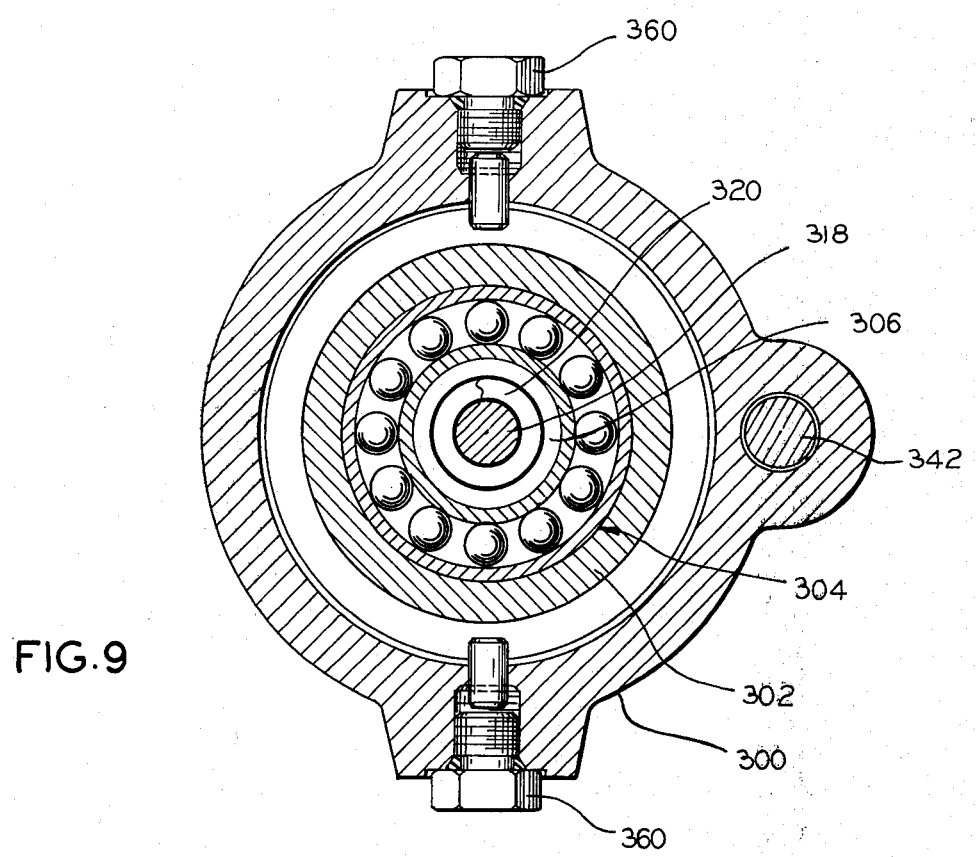
FIG. 9 is a sectional view taken along line 9—9 of FIG. 8.
Figure 10:
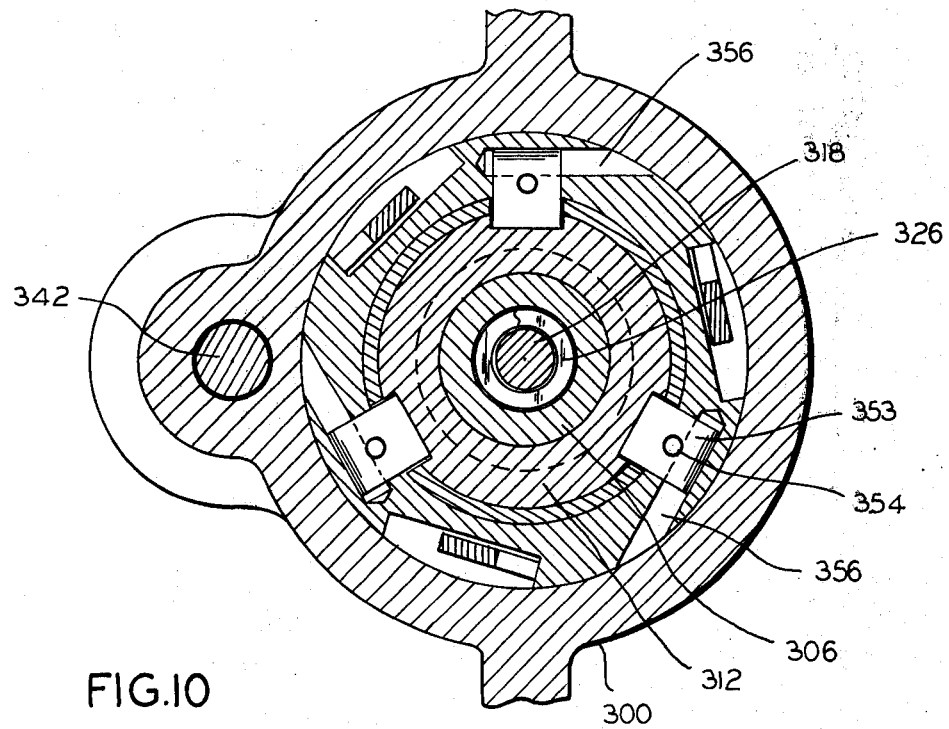
FIG. 10 is a sectional view taken along line 10—10 of FIG. 8.
Figure 13:
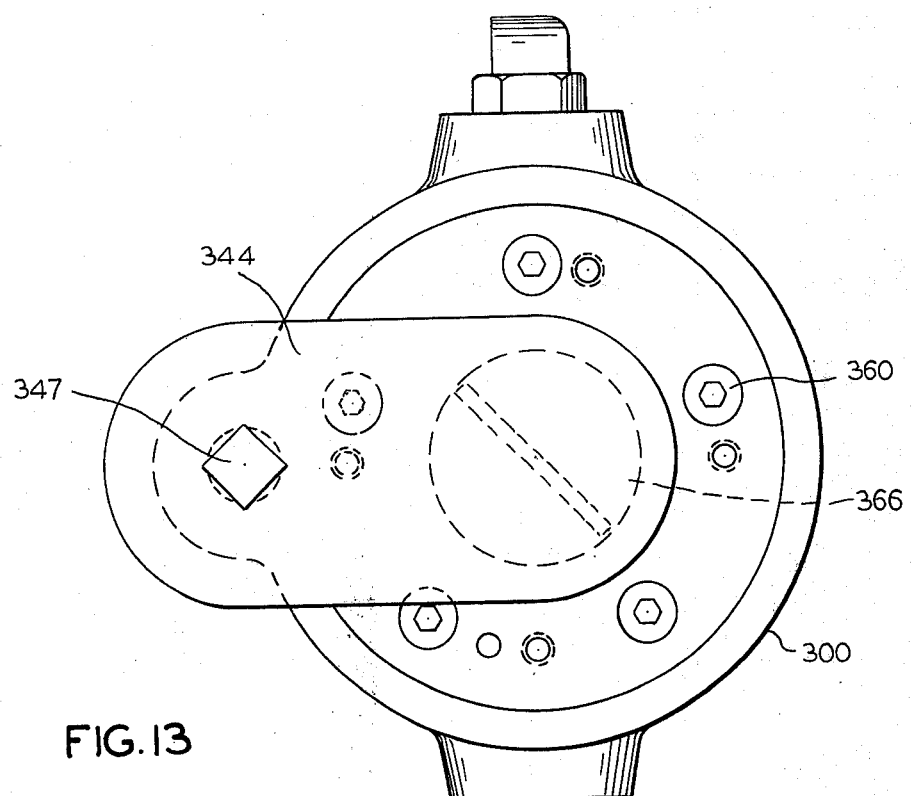
FIG. 13 is an end view of the embodiment of FIG. 7.

An APPLY command to the hydraulic power unit will lower the pressure in the brake housing permitting the compressed Belleville spring 303 to expand advancing that applicator screw assembly to the right (FIGS. 7, 8 and 12). End surface 364 of the actuator nut may then be adapted to bear against a friction element back up plate as described in connection with the prior embodiment to effectively force a pair of brake pads against a disc. Again, such operation is fail-safe in that failure of the electrical power system or hydraulic pressure system will result in an automatic application of the brakes by the Belleville spring 303.

For manual release of the brakes, release arm 356 may be rotated to rotate release gear 334, which rotation is effective to retract spider 328 against piston 302 in order to displace it to its retracted position in engagement with housing end cap 348. Rotation of release arm 346 similarly rotates cover 344 thereby exposing end plug 366. Removal of end plug 366 exposes the internal hexagonal end portion 368 of shaft 306. An appropriate wrench may be inserted into end portion 368 to screw actuator 306 into actuator nut 312 thereby retracting the same.

In this situation, retraction of the actuator nut is not impeded by the slack adjustment assembly because a cam surface 370 associated with release gear 334 is rotated into the one-way clutches 346 to pivot them to the right (FIG. 1) thereby preventing them from gripping the actuator nut.

To take up the slack introduced into the system during manual release, the brakes are simply applied several times in succession, each time advancing the actuator nut through a distance equal to the permissable piston displacement.

Thus it is apparent that there has been provided, in accordance with the invention, a brake actuator that fully satisfies the objects, aims, and advantages set forth above. While the invention has been described in conjunction with specific embodiments thereof, it is evident that many alternatives, modifications and variations will be apparent to those skilled in the art in light of the foregoing description. For example, springs 34 and 303 may be other than the Belleville type. Also, the one-way friction clutches could be constructed as balls or rollers disposed in inclined slots along the exterior surface of the actuator nut such that the balls or rollers would jam between the slot and nut in response to retraction of the actuator nut to prevent the same. Accordingly, it is intended to embrace all such alternatives, modifications and variations as fall within the spirit and broad scope of the appended claims.

We claim:

1. A brake actuator for a brake system having a friction element engageable against a rotatable braking surface and comprising:
    a housing presenting only a single brake control chamber for fluid under pressure;
    a piston reciprocal within the chamber and having a retracted position, said piston being the only piston for exerting brake forces;
    a main spring urging the piston forward away from its retracted position;
    an expansible linkage attached to the piston for imparting the forward translation of the piston to said friction element, said expansible linkage comprising an actuator nut and an actuator screw rotatably supported on the piston and threadedly received within the actuator nut, said actuator screw and nut having threads which lock together in response to forward movement of the piston to prevent rotation relative to one another;
    fluid pressure means for retracting the piston against the urging of the main spring; and
    slack adjuster means responsive to piston retraction causing an extension of the linkage to maintain a generally uniform spring expansion per brake application regardless of friction element wear, the last-named means comprising a one-way friction clutch member having a clutch surface effective to tenaciously grip and hold the actuator nut, permitting forward movement while preventing retracting movement of the actuator nut.

2. The actuator of claim 1 wherein the threads of the actuator screw and nut are generally uniform having wide inclined faces presenting friction surfaces and generally upright opposite faces; engagement of the friction surfaces locking the actuator screw and nut together in fixed angular relationship and disengagement thereof allowing generally free rotation therebetween.

3. The actuator of claim 2 further comprising a preload spring effective to urge the friction surfaces of the actuator screw and nut into mutual engagement.

4. The actuator of claim 1 further comprising a clutch stop member associated with the housing and cooperative with the clutch member to permit retraction of the actuator nut through a limited brake release distance and prohibit further retraction thereof.

5. The actuator of claim 4 wherein the one-way clutch member is pivotal about a point spaced radially from the actuator nut.

6. The actuator of claim 5 further comprising a clutch member spring urging the one-way clutch into engagement with the actuator nut.

7. The actuator of claim 5 further comprising a manual clutch release mechanism for disengaging the clutch surface from the actuator nut and thereby permitting retraction of the actuator nut.

8. The actuator of claim 1 wherein the expansible linkage further comprises a ball bearing nut slidably fitted within the actuator nut and precluded from rotation relative thereto and a ball screw rotatably carried by the piston and threaded into the ball bearing nut, said ball screw being axially aligned with the actuator screw and interlocked for integral translation and rotation therewith.

9. The actuator of claim 1 wherein the retracted position of the piston is adjustable to provide variations in the main spring compression incident to the retracted position of the piston.

10. The actuator of claim 1 wherein the main spring comprises a disc spring.

11. The actuator of claim 1 further comprising a manual brake release mechanism for manually retracting the piston against the urging of the main spring.

12. The actuator of claim 11 further comprising clutch release means effective to disengage the one-way clutch member in response to actuation of the manual brake release mechanism.

13. The actuator of claim 11 wherein the manual brake release mechanism comprises a release shaft rotatably mounted relative to the housing, a release pinion carried by the release shaft, a release gear encompassing the expansible linkage and driven by the release pinion, and a piston retraction device effective to cause retraction of the piston in response to rotation of the release gear.

14. The actuator of claim 13 wherein the piston retraction device comprises a release cam and a cam follower spider which spread apart in response to release gear rotation thereby engaging the piston and retracting the same.

15. Brake apparatus, for a brake system having a friction element engageable against a rotatable braking surface, comprising a housing, an expandable spring confined within the housing for applying the brake, said housing presenting a single brake control chamber for fluid under pressure, a piston within the housing having a retracted position for holding the spring in a state of compression, said piston being the only piston for exerting brake forces, means to supply fluid under pressure to said chamber for holding the piston in its retracted position, a decline in fluid pressure within said chamber releasing the piston and allowing the spring simultaneously to expand whereupon the piston is forced forwardly away from its retracted position, an expandable linkage for coupling the piston to the friction element such that forward movement of the piston is transmitted to said friction element and retracting movement of the piston elongates the expandable linkage forwardly to compensate for friction element wear, said expandable linkage comprising an actuator nut and an actuator screw attached to the piston, said actuator screw and nut having threads which lock together in response to forward movement of the piston to prevent rotation relative to one another, and a one-way friction clutch member having a clutch surface effective to tenaciously grip and hold the actuator nut, permitting forward movement while preventing retracting movement of the actuator nut.

16. The brake apparatus of claim 15 further comprising a pre-load spring urging the threads of the actuator screw and nut together.

17. The brake apparatus of claim 16 wherein the one-way clutch member is a pivotal member.

18. A disc brake caliper for forcing a brake pad against the braking surface of a rotating disc to restrain rotation thereof, comprising:

a housing;

an opening through the housing having a cylindrical portion presenting only a single brake control chamber for fluid under pressure;

a piston reciprocative within the cylindrical portion and having a retracted position, said piston being the only piston for exerting brake forces;

a spring urging the piston forward away from its retracted position;

means for supplying fluid under pressure to said chamber to retract the piston against the urging of the spring, a decline in fluid pressure in said chamber releasing the piston and allowing the spring to expand;

a back-up plate for supporting a brake pad, said plate overlying one end of the opening and being axially translatable relative thereto;

a one-way screw mechanism, coupling the piston to said back-up plate, comprising an actuator nut slidably mounted within said opening for movement in unison with the back-up plate and an actuator screw rotatably carried by the piston and threaded into the actuator nut, and a one-way friction clutch member having a clutch surface tenaciously engageable with the actuator nut to grip and prevent retraction thereof while permitting forward movement thereof;

forward movement of the piston causing the one-way screw mechanism to lock-up through the threads and thereby impart such forward motion to the back-up plate; and retraction of the piston causing engagement of the one-way clutch member with the actuator nut as aforesaid and separation of said threads allowing rotational retraction of the actuator screw rearward out of the actuator nut to compensate for brake pad wear, thereby maintaining a generally uniform spring expansion per brake application.

* * * * *